US012496657B2

(12) United States Patent
Bocksrocker et al.

(10) Patent No.: US 12,496,657 B2
(45) Date of Patent: Dec. 16, 2025

(54) SPLATTER DETECTION BY ARTIFICIAL INTELLIGENCE DURING LASER PROCESSING

(71) Applicant: TRUMPF Laser- und Systemtechnik GmbH, Ditzingen (DE)

(72) Inventors: Oliver Bocksrocker, Sachsenheim (DE); Julia Hartung, Rottweil (DE); Andreas Jahn, Dornhan (DE); Vinayakraj Salvarrajan, Ehningen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 108 days.

(21) Appl. No.: 18/591,028

(22) Filed: Feb. 29, 2024

(65) Prior Publication Data
US 2024/0198450 A1 Jun. 20, 2024

Related U.S. Application Data

(63) Continuation of application No. PCT/EP2022/074377, filed on Sep. 1, 2022.

(30) Foreign Application Priority Data

Sep. 6, 2021 (DE) ...................... 10 2021 123 038.1

(51) Int. Cl.
*B23K 26/03* (2006.01)
*B23K 26/21* (2014.01)
(Continued)

(52) U.S. Cl.
CPC ............ *B23K 26/032* (2013.01); *B23K 26/21* (2015.10); *B23K 31/006* (2013.01); *B23K 31/125* (2013.01)

(58) Field of Classification Search
CPC .... B23K 26/032; B23K 26/21; B23K 31/006; B23K 31/125; G06T 2207/20081;
(Continued)

(56) References Cited

U.S. PATENT DOCUMENTS 9,501,821 B2 * 11/2016 Pfitzner ................ B23K 26/034
2013/0178953 A1 7/2013 Wersborg et al.
2022/0011726 A1 1/2022 Schwarz

FOREIGN PATENT DOCUMENTS

CN 106442543 B 10/2019
CN 113207286 A 8/2021
(Continued)

OTHER PUBLICATIONS

Machine translation of WO 2020104103 A1 (Year: 2020).*
(Continued)

*Primary Examiner* — Seung C Sohn
(74) *Attorney, Agent, or Firm* — LEYDIG, VOIT & MAYER, LTD.

(57) ABSTRACT

A method for identifying splatters or weld seam defects during laser processing of a workpiece includes processing the workpiece using a processing laser beam of a laser processing machine, compiling at least one recording of radiation emerging during the processing of the workpiece using an optical sensor that has a plurality of pixels for recording the radiation, and inputting the at least one recording into an evaluation unit. The evaluation unit has a machine learning algorithm configured as a convolutional neural network in a U-Net architecture. The machine learning algorithm has been trained with verified recordings of splatters or weld seam defects. The method further includes identifying one or more splatters or weld seam defects in the processing of the workpiece by running the machine learning algorithm using the at least one recording as input, and
(Continued)

outputting an output indicating the identified one or more splatters or weld seam defects.

13 Claims, 1 Drawing Sheet

(51) Int. Cl.
*B23K 31/00* (2006.01)
*B23K 31/12* (2006.01)

(58) Field of Classification Search
CPC . G06T 2207/20084; G06T 2207/30108; G06T 7/0004
See application file for complete search history.

(56) References Cited

FOREIGN PATENT DOCUMENTS

| | | |
|---|---|---|
| CN | 215034463 U | 12/2021 |
| DE | 102019209100 A1 | 12/2020 |
| DE | 102019214180 A1 | 3/2021 |
| WO | WO 2020104103 A1 | 5/2020 |
| WO | WO 2021003907 A1 | 1/2021 |

OTHER PUBLICATIONS

Ronneberger, et al.: "U-Net: Convolutional Networks for Biomedical Image Segmentation", Computer Science Department and BIOSS Centre for Biological Signalling Studies, University of Freiburg, Germany, http://lmb.informatik.uni-freiburg.de/, pp. 1-8, arXiv: 1505.04597v1 [cs. CV], May 18, 2025.

Wang, et al.: "U-Net Using Stacked Dilated Convolutions for Medical Image Segmentation", Department of Radiology, Massachusetts General Hospital, Harvard Medical School, Boston MA, USA, pp. 1-8, arXiv, 2004.

Gadosey "SD-UNet: Stripping down U-Net for segmentation of biomedical images on platforms with low computational budgets", Diagnostics 2020, 10, 110, pp. 1-18, Feb. 18, 2020, MDPI, Basel, Switzerland.

Guo, Changlu: "SD-Unet: A structured dropout U-Net for retinal vessel segmentation", 2019 IEEE 19th International Conference on Bioinformatics and Bioengineering (BIBE), 2019, pp. 439-444, 2471-7819/19 IEEE, USA.

Zhao: "Spherical deformable U-Net: Application to cortical surface parcellation and development prediction", IEEE Transactions on Medical Imaging, Apr. 2021, pp. 1217-1228, vol. 40, No. 4, IEEE, USA.

Dong Xinghui et al.,"Defect detection and classification by training a generic convolutional neural network encoder," IEEE Transactions on Signal Processing, Oct. 19, 2020, pp. 1-15, vol. 68, IEEE, New York City, USA.

Lei Yang et al., "An automatic welding defect location algorithm based on deep learning," NDT & E International, Jun. 2021, pp. 1-10, vol. 120, 102435, Elsevier, Amsterdam, Netherlands.

Zhang Yanxi et al.," Welding defects detection based on deep learning with multiple optical sensors during disk laser welding of thick plates," Journal of Manufacturing Systems, Apr. 2019, pp. 87-94, vol. 51, Elsevier, Amsterdam, Netherlands.

Vater Johannes et al., "Fault Classification and Correction based on Convolutional Neural Networks exemplified by laser welding of hairpin windings," In 2019 9th International Electric Drives Production Conference (EDPC), Dec. 2019, pp. 1-8, IEEE, New York City, USA.

Nicolosi Leonardo et al., "A monitoring system for laser beam welding based on an algorithm for spatter detection," In 2011 20th European Conference on Circuit Theory and Design (ECCTD), Aug. 29, 2011, pp. 25-28, IEEE, New York City, USA.

\* cited by examiner

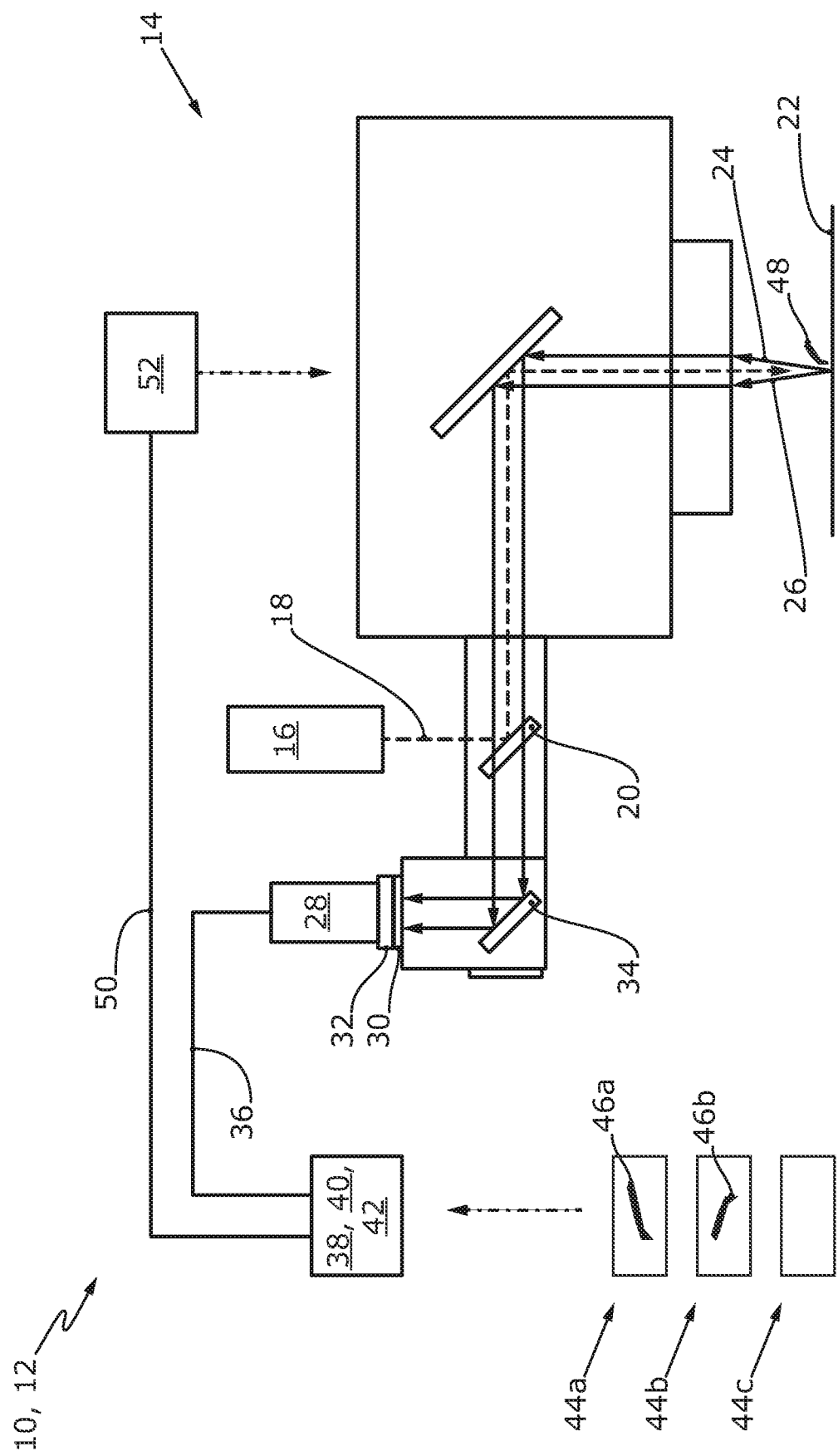

SPLATTER DETECTION BY ARTIFICIAL INTELLIGENCE DURING LASER PROCESSING

CROSS REFERENCE TO RELATED APPLICATIONS

This application is a continuation of International Application No. PCT/EP2022/074377 (WO 2023/031353 A1), filed on Sep. 1, 2022, and claims benefit to German Patent Application No. DE 10 2021 123 038.1, filed on Sep. 6, 2021. The aforementioned applications are hereby incorporated by reference herein.

FIELD

Embodiments of the present invention relate to a method and a device for splatter detection or the detection of weld seam defects during laser processing.

BACKGROUND

Conventional image processing algorithms are used in order to achieve splatter identification during laser processing. In these methods, an analysis of a recording takes place with the aid of rigidly predefined geometrical features or with the aid of rigidly predefined brightness features. If the type and/or size of the splatters differ from these predefined features, however, splatter detection does not take place, or only unreliable splatter detection takes place.

Methods and devices which monitor melting processes with a camera instrument by means of semantic segmentation with the use of neural networks are known in the prior art.

SUMMARY

Embodiments of the present invention provide a method for identifying splatters or weld seam defects during laser processing of a workpiece. The method includes processing the workpiece using a processing laser beam of a laser processing machine, compiling at least one recording of radiation emerging during the processing of the workpiece using an optical sensor that has a plurality of pixels for recording the radiation, and inputting the at least one recording into an evaluation unit. The evaluation unit has a machine learning algorithm configured as a convolutional neural network in a U-Net architecture. The machine learning algorithm has been trained with verified recordings of splatters or weld seam defects. The method further includes identifying one or more splatters or weld seam defects in the processing of the workpiece by running the machine learning algorithm using the at least one recording as input, and outputting an output indicating the identified one or more splatters or weld seam defects.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a schematic representation of the method according to embodiments of the invention and the device according to embodiments of the invention.

DETAILED DESCRIPTION

Embodiments of the invention can achieve reliable splatter detection or detection of weld seam defects during the laser processing of a workpiece.

Embodiments of the invention provide a method for identifying a splatter during the laser processing of a workpiece. The method has the following method steps:
  A) laser processing of the workpiece (22) with a processing laser beam (18) of a laser processing machine (14);
  B) compilation of at least one recording (44*a-c*) of radiation emerging during the laser processing with an optical sensor (28), the optical sensor (28) having a plurality of pixels for recording the radiation;
  C) supply of the recording (44*a-c*) to an evaluation unit (38) having a machine learning algorithm (40), which is configured as a neural network (42) in the form of a U-Net architecture of a convolutional neural network, the algorithm (40) having been trained with verified recordings (44*a-c*) of splatters (46*a, b*) or weld seam defects and identifying one or more splatters (48) or weld seam defects in the supplied recording (44*a-c*);
  D) output of an output (50) in the event of an identified splatter (48) or weld seam defect.

The method according to embodiments of the invention allows splatter identification or identification of weld seam defects during laser processing independently of the temperature (luminous intensity), the geometrical shape and/or the speed of the splatters. Weld seam defects are, in particular, pores or holes on a weld seam during laser welding. Clear discrimination between splatters and other luminous phenomena that occur during laser processing is made possible. Furthermore, an early warning may be output in the event of a splatter increase and/or increase of weld seam defects. The neural network is configured in the form of a U-Net architecture of a convolutional neural network. The convolutional neural network allows comprehensive training of the neural network with the aid of only few recordings. The U-Net architecture as a configuration of a convolutional neural network has proven to be advantageous for specific application to laser processing operations. Rapid processing times and low performance requirements of computer processors used in the evaluation unit are thereby achieved. Alternatively or in addition, the neural network may be trained by means of transfer learning with few recordings.

In one example, in the U-Net architecture, the recording data of the recording are encoded by means of convolution in a first convolutional layer and the recording data of the recording are also encoded with at least one dilated kernel. A dilated kernel makes it possible to leave out individual pixels of the image matrix. A convolution operation with a dilated kernel is also referred to as dilated convolution.

The encoded reduced recording data may subsequently be transmitted to a second convolutional layer. In connection with splatter identification and the identification of weld seam defects, it has proven advantageous to use a plurality of kernels having different reduction factors. The reduction factor in kernels refers to the extent of the dilation of the kernel. A high reduction factor leads to a correspondingly high dilation of the kernel.

The recordings may be compiled from various viewing angles (perspectives).

The recording(s) may be compiled in the form of a grayscale image in order to accelerate the processing of the recording(s). Furthermore preferably, one or more recording(s) are input in the form of a grayscale image having a size of 256×256 pixels or 128×128 pixels. The recording(s) may originally be compiled with a higher resolution, for example 720×540 pixels.

Preferably, the optical imaging during the compilation of the recording(s) is selected so that at least the entire process zone width is imaged.

A laser beam having a wavelength of from 400 nm to 450 nm (blue), 515 nm (green) and/or from 800 nm to 1200 nm (IR), in particular of 1030 nm or 1070 nm, is preferably used as the processing laser beam.

The training data set having verified recordings may advantageously be increased by rotation, vertical displacement, horizontal displacement, vertical reflection, horizontal reflection, adaptation of the brightness range, zooming and/or shearing.

The pixels of the verified recordings may be divided into "background", "process glow" and "splatters".

In one preferred configuration of the method, the neural network may carry out a semantic segmentation. A pixel-accurate resolution may thereby be achieved.

The optical sensor may be configured in the form of a position- and time-resolving two-dimensional sensor. The optical sensor may be connected to the evaluation unit by means of a network connection.

The exposure time of the optical sensor per recording is preferably between 1 µs and 20000 µs, in particular between 1 µs and 1000 µs.

The observed wavelength range is preferably between 300 nm and 2000 nm, in particular between 800 nm and 1100 nm.

In one preferred configuration of the method according to embodiments of the invention, the wavelength of the processing laser beam is blocked upstream of the optical sensor by an optical filter. For this purpose, for example, a bandpass filter for wavelengths of between 800 nm and 1000 nm may be used. Alternatively or in addition thereto, a broadband filter whose spectral width is preferably less than or equal to 200 nm may be used.

In addition thereto, an improved contrast between a splatter and the light emission from the process zone may be achieved by the use of an optical filter.

The splatters may stand out against a dark background if no additional external illumination is used. As an alternative to this preferred embodiment, additional illumination may be used. In this case, dark splatters stand out against the bright background. In particular, an illumination laser having a wavelength of between 800 nm and 1000 nm may be used as additional illumination.

The architecture of the neural network is preferably based on a stacked dilated U-Net (SDU-Net) architecture proposed by Wang et. al. [Wang, S.; Hu, S. Y.; Cheah, E.; Wang, X.; Wang, J.; Chen, L.; Baikpour, M.; Ozturk, A.; Li, Q.; Chou, S. H.; Lehman, C. D.; Kumar, V.; Samir, A. U-Net using stacked dilated convolutions for medical image segmentation. arXiv, 2020] (The abbreviation SD stands for stacked dilated). There are further U-Net modifications called SDU-Nets, in which the abbreviation SD stands for various concepts. For example, there is the spherical deformable U-Net (SDU-Net) of Zhao et al., which has been developed for medical imaging in the inherent spherical space [Zhao, F.; Wu, Z.; Wang, L.; Lin, W.; Gilmore, J. H.; Xia, S.; Shen, D.; Li, G. Spherical Deformable U-Net: Application to Cortical Surface Parcellation and Development Prediction. IEEE Transactions on Medical Imaging 2021. doi: 10.1109/TMI.2021.3050072.]. A further SDU-Net, which is termed a modification of the U-Net, is the structured dropout U-Net of Guo et. al. [Guo, C.; Szemenyei, M.; Pei, Y.; Yi, Y.; Zhou, W. SD-Unct: A Structured Dropout U-Net for Retinal Vessel Segmentation. Proceedings—2019 IEEE 19th International Conference on Bioinformatics and Bioengineering, BIBE 2019, 2019. doi: 10.1109/BIBE.2019.00085.]. Instead of the traditional dropout for convolutional layers, they propose a structured dropout to regularize the U-Net. Gadoscy et al. present the stripping down U-Net, with the same abbreviation for the segmentation of images on a platform with a low computational budget. By the use of depthwise separable convolutions, they design a lightweight deep neural network architecture which is inspired by the U-Net model [Gadosey, P. K.; Li, Y.; Agyekum, E. A.; Zhang, T.; Liu, Z.; Yamak, P. T.; Essaf, F. SD-UNET: Stripping down U-Net for segmentation of biomedical images on platforms with low computational budgets. Diagnostics 2020, 10. doi: 10.3390/diagnostics10020110.].

Preferably, an SDU-Net modification with stacked convolutional layers is used. This U-Net variant adopts the architecture of the vanilla U-Net but uses stacked dilated convolutions. Instead of two standard convolutional layers in each encoding and decoding operation, the SDU-Net uses one standard convolutional layer followed by a plurality of dilated convolutional layers, which are concatenated as input for the next operation. The SDU-Net is therefore deeper than a comparable U-Net architecture and has a larger receptive field.

The optical sensor may be configured in the form of a camera. The camera may be configured in the form of a high-speed camera.

The camera may have a CMOS sensor and/or a CCD sensor.

In one preferred configuration, the optical sensor may be arranged coaxially with the processing laser beam.

A plurality of recordings may be compiled in method step B). These may be transferred to the evaluation unit in method step C) in order to identify one or more splatters. Alternatively or in addition thereto, maximum-value images may be assessed by the evaluation unit during the laser processing. The variation of the splatter behaviour as a function of time during the laser processing may thereby be recorded well.

The recording rate of the camera is preferably more than 20 Hz, in particular more than 100 Hz.

In one preferred embodiment of the invention, the method has the following method step:

E) control or regulation of the processing laser beam in the event of the identification of one or more splatters.

In this way, low-splatter or even splatter-free laser processing may be achieved.

Preferably, the laser processing takes place in the form of laser welding. During laser welding, preferably at least two metallic components, for example based on iron, copper and/or aluminium, are joined. The components may consist of the same material or different materials. The welding depth is preferably more than 100 µm and less than 20 mm. The aspect ratio of depth to width of the weld seam is preferably more than 0.5:1, so that keyhole welding takes place.

Embodiments of the invention also provide a device for identifying a splatter during the laser processing of a workpiece, in particular by a device for carrying out a method as described here. The device has a laser processing machine with a processing laser beam, an optical sensor with a plurality of pixels for the recording of radiation that occurs during the laser processing, an evaluation unit with a machine learning algorithm for the identification of a splatter, and an output unit for the output of an output in the event of an identified splatter.

The device may comprise a fibre-optic cable which is used actively, particularly in the case of a fibre laser, or passively, particularly in the case of a disk laser. The fibre-optic cable may have a core fibre which is enclosed by a ring fibre. The core fibre may preferably have a diameter of between 10 μm and 50 μm or between 50 μm and 400 μm, in particular between 50 μm and 200 μm. The outer diameter of the ring fibre is preferably between 40 μm and 2000 μm, in particular between 80 μm and 800 μm. In one preferred configuration, the diameter ratio of the core fibre to the ring fibre is from 1:2 to 1:10, in particular 1:4.

The beam diameter of the core fibre on the workpiece is preferably between 10 μm and 300 μm, in particular between 30 μm and 70 μm in single mode, or between 50 μm and 1200 μm in multimode. The beam parameter product of the core beam is preferably between 0.38 mm*mrad and 16 mm*mrad, in particular less than or equal to 0.6 mm*mrad in single mode, or less than or equal to 8 mm*mrad in multimode.

The fibre-optic cable may have a single-spot fibre.

The laser processing machine may have a scanner optic unit and/or "flying optics". The imaging ratio is preferably from 1:1 to 5:1, in particular from 1.5:1 to 2:1.

The device is preferably configured in the form of a laser welding machine.

Further advantages of the invention may be found from the description and the drawing. Likewise, according to embodiments of the invention the features mentioned above and those yet to be explained further may respectively be used individually or together in any desired combinations. The embodiments shown and described should not be understood as an exhaustive list, but rather are of an exemplary character for describing the invention.

FIG. 1 shows a device 10 according to embodiments of the invention for carrying out a method 12 according to embodiments of the invention. The device 10 has a laser processing machine 14, particularly in the form of a laser welding machine. The laser processing machine 14 has a processing laser beam source 16 for the emission of a processing laser beam 18. The processing laser beam 18 can be coupled through a first semi-transparent mirror 20 into the optical system of the laser processing machine 14 and subsequently impinge on a workpiece 22. The first semi-transparent mirror 20 is preferably configured in the form of a dichroic mirror or of an aperture mirror.

A process glow 24 due to the laser processing emerges from the workpiece 22. As an alternative or in addition thereto, the reflection 26 of an additional illumination (not shown), in particular the reflection 26 of an additional illumination laser, may emerge from the workpiece 22. The process glow 24 and/or the reflection 26 of an additional illumination, generally referred to here as "radiation", may be detected by an optical sensor 28.

The optical sensor 28 is in the present case aligned coaxially with the processing laser beam 18. An optical filter 30 may be provided in order to protect the optical sensor 28 from the processing laser beam 18. The optical sensor 28 may be preceded by a collimation lens 32. The optical sensor 28 is preferably configured in the form of a camera, in particular having a CMOS or CCD sensor.

A second semi-transparent mirror 34 may be provided in order to deviate the process glow 24, or the reflection 26 of an additional illumination. The second semi-transparent mirror 34 may be configured in the form of a dichroic mirror or of an aperture mirror.

A signal 36 of the optical sensor 28 is supplied to an evaluation unit 38, which has a machine learning algorithm 40. The algorithm 40 may have a neural network 42.

The neural network 42 is configured in the form of a convolutional neural network. It has a U-Net architecture, and may be configured to carry out a semantic segmentation. The image recording takes place positionally resolved with a resolution of 2 pixels or more.

In one example, in the U-Net architecture, the recording data of the recording are encoded by means of convolution in a first convolutional layer and the recording data of the recording are also encoded with at least one dilated kernel. A dilated kernel makes it possible to leave out individual pixels of the image matrix. A convolution operation with a dilated kernel is also referred to as dilated convolution.

The encoded reduced recording data may subsequently be transmitted to a second convolutional layer. In connection with splatter identification and the identification of weld seam defects, it has proven advantageous to use a plurality of kernels having different reduction factors. The reduction factor in kernels refers to the extent of the dilation of the kernel. A high reduction factor leads to a correspondingly high dilation of the kernel. In the following formula for the mathematical convolution, the variable/denotes the reduction factor. If l=1 is set, a normal convolution takes place without dilation of the kernel.

$$(F * lk)(p) = \sum_{s+lt=p} F(s)k(t)$$

In one example, a plurality of kernels are selected, each having a different reduction factor, with a plurality of four kernels. The recording data encoded in this way with four dilated kernels having different reduction factors are transmitted to a second convolutional layer. In this way, the set of recording data for the training of the convolutional neural network may be reduced, and the training takes place more rapidly and with less computing power. Only a small two-digit number of image recordings, for example thirty recordings, are needed for this purpose as recording data of the image recordings or recordings of the laser processing.

The machine learning algorithm 40 has been or is trained by a plurality of recordings 44a, 44b, 44c. Recorded splatters 46a, 46b or weld seam defects are imaged on at least some recordings 44a-c. The algorithm 40 is thereby configured to detect a splatter 48 or weld seam defect that occurs during the laser processing. The device 10, and the method 12, are configured to output an output 50 when a splatter 48 or weld seam defect has been detected. The output 50 may take place immediately after the detection of the splatter 48 or with a time offset from the detection of the splatter 48 or weld seam defect. The splatters 48 or weld seam defects that occur may be used after their verification as recorded splatters 46a, b or recorded weld seam defects for further training of the algorithm 40 used in the method 12.

The output 50 may be supplied to a control unit 52 of the device 10 in order to control or regulate the laser processing machine 14.

In view of the drawing, embodiments of the invention relate to a method 12 and a device 10 for recording splatters 48 or weld seam defects during the laser processing of a workpiece 22 with a processing laser beam 18. The process glow 24 generated during the laser processing and/or the reflection 26 of an additional illumination is/are recorded by an optical sensor 28. The optical sensor 28 records at least one recording 44*a-c*, in particular a plurality of recordings 44*a-c*, and transmits its or their signal 36 to an evaluation unit 38. The evaluation unit 38 has a machine learning algorithm 40, as described. The algorithm 40 is trained by previously recorded and assessed recordings 44*a-c*, in particular with recorded splatters 46*a, b* or weld seam defects. The algorithm 40 is configured to identify a splatter 48 or weld seam defect that occurs during the laser processing and to output this information as output 50. The output 50 may take place to a control unit 52 for the control or regulation of the laser processing machine 14.

The application of the described method and of the device is suitable for workpieces 22 made from the materials aluminium and copper.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 device
12 method
14 laser processing machine
16 processing laser beam source
18 processing laser beam
20 first semi-transparent mirror
22 workpiece
24 process glow
26 reflection of additional illumination
28 optical sensor
30 optical filter
32 collimation lens
34 second semi-transparent mirror
36 signal of the optical sensor 28
38 evaluation unit
40 machine learning algorithm
42 neural network
44*a-c* recording
46*a, b* recorded splatter
48 splatter that occurs during the laser processing
50 output
52 control unit

The invention claimed is:

1. A method for identifying splatters or weld seam defects during laser processing of a workpiece, the method comprising:
   A) processing the workpiece using a processing laser beam of a laser processing machine;
   B) compiling at least one recording of radiation emerging during the processing of the workpiece using an optical sensor, wherein the radiation emerging during the processing is from a process glow having wavelengths in a range of from about 800 nm to about 1000 nm, the optical sensor having a plurality of pixels for recording the radiation;
   C) inputting the at least one recording into an evaluation unit, the evaluation unit having a machine learning algorithm configured as a convolutional neural network in a U-Net architecture, the machine learning algorithm having been trained with verified recordings of splatters or weld seam defects, and identifying one or more splatters or weld seam defects in the processing of the workpiece by running the machine learning algorithm using the at least one recording as input; and
   D) outputting an output indicating the identified one or more splatters or weld seam defects.

2. The method as claimed in claim 1, wherein, in the U-Net architecture, recording data of the at least one recording are encoded by a convolution in a first convolutional layer of the convolutional neural network, and the recording data of the recording are also encoded with at least one dilated kernel.

3. The method as claimed in claim 2, wherein the recording data encoded with the at least one dilated kernel are transmitted to a second convolutional layer of the convolutional neural network.

4. The method as claimed in claim 2, wherein a plurality of kernels having different reduction factors are used in the convolutional neural network.

5. The method as claimed in claim 2, wherein the convolutional neural network carries out a semantic segmentation.

6. The method as claimed in claim 1, wherein the optical sensor comprises a camera.

7. The method as claimed in claim 1, wherein the optical sensor is arranged coaxially with the processing laser beam.

8. The method as claimed in claim 1, wherein the at least one recording comprises a plurality of recordings compiled sequentially, and the plurality of recordings are input into the evaluation unit in order to identify the one or more splatters or weld seam defects.

9. The method as claimed in claim 1, further comprising:
   E) controlling the processing laser beam in response to identifying the one or more splatters or weld seam defects.

10. The method as claimed in claim 1, wherein the processing of the workpiece comprises laser welding.

11. A device for identifying splatters or weld seam defects during laser processing of a workpiece, the device comprising:
   a) a laser processing machine with a processing laser beam;
   b) an optical sensor for compiling at least one recording of radiation emerging during the laser processing, wherein the radiation emerging during the laser processing is from a process glow having wavelengths in a range of from about 800 nm to about 1000 nm, the optical sensor having a plurality of pixels for recording the radiation;

c) an evaluation unit having a machine learning algorithm configured as a convolutional neural network in a U-Net architecture, the recording being input into the evaluation unit, the machine learning algorithm having been trained with verified recordings of splatters or weld seam defects in order to identify one or more splatters or weld seam defects in the processing of the workpiece; and d) an output unit for outputting an output indicating the identified one or more splatters or weld seam defects.

12. The device as claimed in claim 11, wherein the laser processing machine is configured as a laser welding machine.

13. The device as claimed in claim 11, wherein the laser processing machine comprises a bandpass filter for filtering the wavelengths in the range of from about 800 nm to about 1000 nm for the recording by the optical sensor.

* * * * *